United States Patent
Shavit et al.

(10) Patent No.: US 12,443,708 B2
(45) Date of Patent: Oct. 14, 2025

(54) REDUCTION OF SECURITY DETECTION FALSE POSITIVES

(71) Applicant: Microsoft Technology Licensing, LLC, Redmond, WA (US)

(72) Inventors: Shalom Shay Shavit, Yehud (IL); Ram Haim Pliskin, Rishon Lezion (IL); Daniel Davraev, Or Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 439 days.

(21) Appl. No.: 18/108,978

(22) Filed: Feb. 13, 2023

(65) Prior Publication Data
US 2024/0273189 A1 Aug. 15, 2024

(51) Int. Cl.
*G06F 21/55* (2013.01)
(52) U.S. Cl.
CPC ................... *G06F 21/554* (2013.01)
(58) Field of Classification Search
CPC .................................................. G06F 21/554
See application file for complete search history.

(56) References Cited

U.S. PATENT DOCUMENTS

| 2011/0113076 | A1 | 5/2011 | Jo et al. |
| 2017/0329968 | A1* | 11/2017 | Wachdorf ............. G06F 21/566 |
| 2018/0077187 | A1* | 3/2018 | Garman ................ G06F 21/566 |
| 2020/0183607 | A1 | 6/2020 | Prasad et al. |

FOREIGN PATENT DOCUMENTS

| CN | 102750198 B | 1/2016 |
| CN | 106407411 A | 2/2017 |
| CN | 111144077 A | 5/2020 |
| CN | 113342579 A | 9/2021 |

OTHER PUBLICATIONS

Redmond, Tony, "How to Search the Microsoft 365 Audit Log for SharePoint and OneDrive Deletion Events", Retrieved From: https://office365itpros.com/2021/12/16/sharepoint-online-deletion/, Dec. 16, 2021, 7 Pages.

* cited by examiner

*Primary Examiner* — Hee K Song
(74) *Attorney, Agent, or Firm* — Schwegman Lundberg & Woessner, P.A.

(57) ABSTRACT

Systems and techniques for reduction of security detection false positives are described herein. Suspicious activity data is obtained for an operation. Operation data is obtained for the operation. It is determined that the operation is related to a parent operation that has not triggered an alert. The operation is cleared from the suspicious activity data.

20 Claims, 5 Drawing Sheets

REDUCTION OF SECURITY DETECTION FALSE POSITIVES

TECHNICAL FIELD

Embodiments described herein generally relate to computer security threat detection and, in some embodiments, more specifically to reducing false positives in security detection using clearing operations.

BACKGROUND

Security detection processes using machine learning models or rules-based detection may balance false positives and false negatives. The goal of effective security detection is to detect all attacks and anomalies while generating as few false positives as possible. Accurate detection can result in high levels of false positives. It may be desirable to increase detections while minimizing false positive detections

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
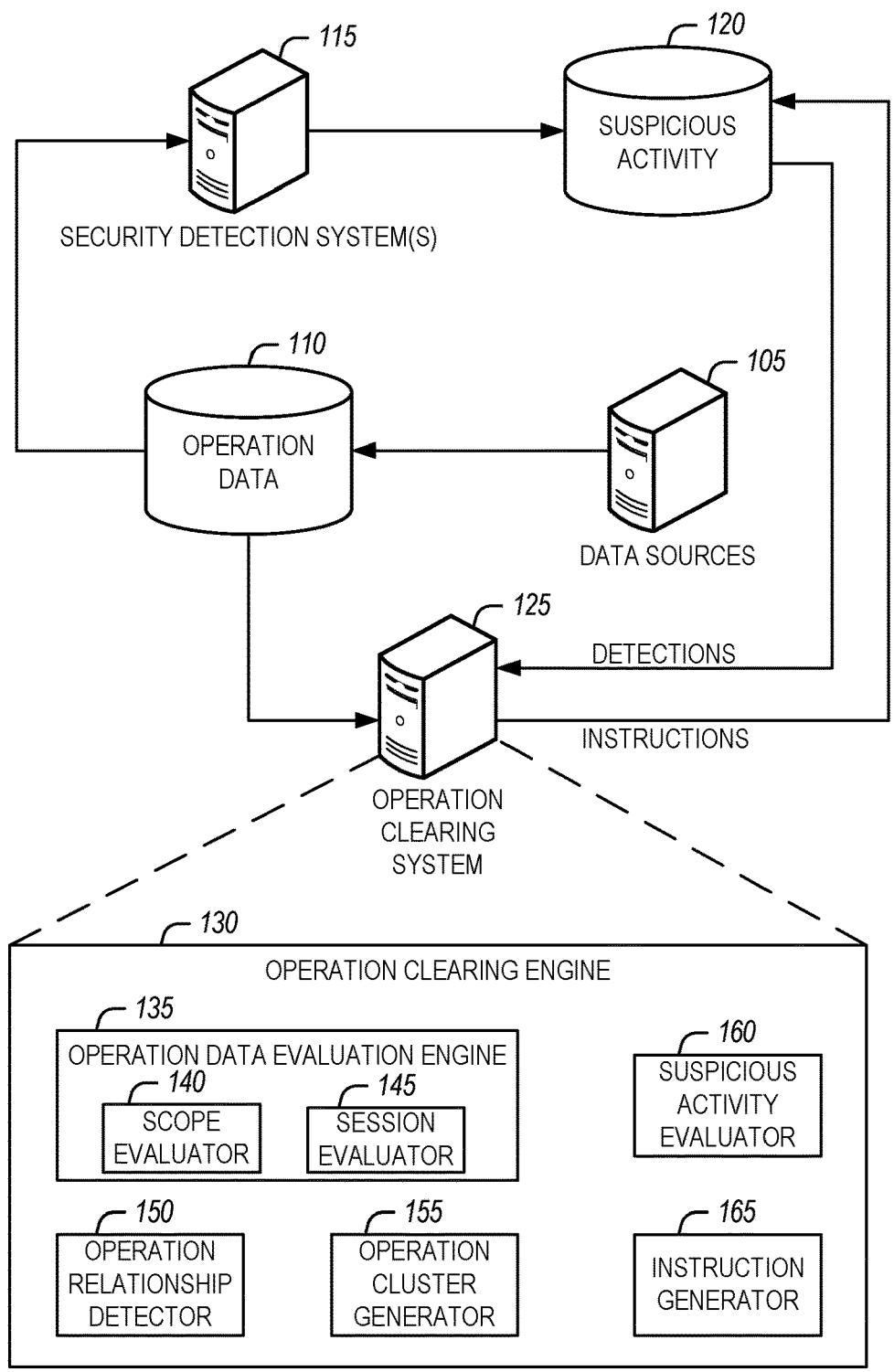
FIG. 1 is a block diagram of an example of an environment and a system for reduction of security detection false positives, according to an embodiment.

A security detection, as the name implies, is an analytic based on data source(s), which can be raw data or outputted by previous layer such as a machine learning (ML) model, with the aim to flag any malicious or suspected malicious activity present in the data. The analytic can be based on a set of conditional rules, a statistical model, ML driven model or a combination of rules and models.

A challenge of security detections is finding a balance between false positives and false negatives. The goal of effective security detection is to detect all attacks/anomalies while generating as few false positives as possible. Conventional approaches to finding a proper balance between false positives and false negatives make use of different threshold adjustments when detection is based on machine learning or statistics or a rule combination that is strong enough to flag attacks as accurately as possible when a rules-based approach is used for detection.

A problem with conventional threshold adjustment is that when stricter thresholds are set, false negatives are introduced while setting a more lenient threshold results in an increased false positive rate. Similarly, stronger rule sets may introduce more false positives while less strict rule sets may introduce more false negatives.

The systems and techniques discussed herein provide a reduction in false positive detection based on evaluation of operations performed during an activity session that would allow use of more lenient thresholds while keeping false positive rates low. Clearing operations are performed to validate normal operations that may have been detected as false positives. Clearing operations can validate normal operation that can be either data-plane operations or control-plane operations that have a very low likelihood of being used by a malicious entity as part of an attack. As such, the operations can be uses to clear suspicious activity sessions allowing for more lenient thresholds by compensating for anticipated higher false positive rate. The reduction in the false positive rate is achieved by checking for the presence of such operations within an activity session.

The clearing operations can be adjusted per the input data source to accommodate a variety of activity and is not bound to a single data provider. The technical advantage of this solution is that it improves upon conventional security detection thresholding and rule setting by utilizing a unique approach of reducing false positives outside of the security detection process.

Another layer is utilized that has not been used before to reduce the false positive rate of the security detection by introducing the list of clearing operations which can be adjusted to fit the input data and specific detection and operational scenarios. Unique fields are leveraged that reside within a cloud computing control layer dataset (e.g., MICROSOFT® AZURE® resource manager ARM), etc.), which allows lower generic thresholds while maintaining the integrity of security scenarios.

A variety of fields are evaluated to validate an operation that is flagged as suspicious activity or to prevent operations from being flagged as suspicious activity. Scope of an operation can be evaluated to validate that the operation is limited risk. Scope includes lists of operations that can trigger an alert and lists of operations that should prevent an alert from surfacing. The lists of operations that should prevent an alert from surfacing can include operations that are affecting a different scope from compromised resource operations that may be present in the lists of operations that can trigger an alert. For example, the operation provider-.keyvault/vaults/accesspolicies/write may belong to a list of operations that can trigger an alert that is generated by an operation "provider.resources/tags/write" from a list of operations that should prevent an alert from surfacing with the subscription as the scope of "provider.resources/tags/write" while the scope is the resource of operation provider-.keyvault/vaults/accesspolicies/write.

Sessions can be tracked and evaluated to determine a risk level of associated operations. For example, a cloud computing resource manager session may not typically exist in an operating system (e.g., MICROSOFT® WINDOWS®, etc.). The operations are clustered into sessions by different cloud computing resource manager fields. Fields include, by way of example and not limitation, EventName, Correlation ID, Operation ID, Timestamp, etc.

Some operations are a follow up operations and the EventName field can be evaluated to determine that an operation does not pose a threat. For example, a follow up operation dies not have a "BeginRequest" value, because only the first operation has a "BeginReuqest" value. Rather, the follow up operations have an "EndRequest" value. A parent operation of a child operation can be identified in an authorization.action field indicating that the child operation is a follow up operation of the parent operation.

The Correlation ID enables grouping operations generated by a specific user activity. For example, creating a virtual machine (VM) could lead to execution of more than fifty different operations (e.g., creating the VM, creating the virtual network, adjusting disk size, etc.) that all have the same Correlation ID enabling identification of operations that are part of a specific activity session that a user has initiated.

The Operation ID field enables operations to be clustered together, as in the example VM creation example above, specific operations (e.g., creating the VM, creating the virtual network, adjusting disk size, etc.) can share a specific Operation ID. Identifying and grouping the low risk operations enables the use of detection logic that results in increased threat detections while maintaining a low ratio of true positives to false positives.

FIG. 1 is a block diagram of an example of an environment 100 and a system 130 for reduction of security detection false positives, according to an embodiment. The example environment 100 includes data sources 105 (e.g., computing platforms, applications, databases, etc.) that output operation data 110 and a security detection system 115 that uses machine learning models and detection rules to identify suspicious activity 120. The operation data 110 and suspicious activity 120 are obtained by an operation clearing system 125. The operation clearing system can be a server, a cluster of servers, a cloud computing system, a field programmable gate array (FPGA), an application specific integrated circuit (ASIC), or other computing system that executes instructions stored on a non-transitory machine-readable medium using at least one processor.

The system 130 can include a variety of hardware or software components including an operation data evaluation engine 135 that can include a scope evaluator 140 and a session evaluator 145, an operation relationship detector 150, an operation cluster generator 155, a suspicious activity evaluator 160, and an instruction generator 165. In an example, the system 130 is an operation clearing engine.

The operation data evaluation engine 135 obtains the operation data 110 and evaluates the operation data 110 using the scope evaluator 140 to determine scope of operations that are associated with operations executing at the data sources 105 and evaluates the operation data 110 using the session evaluator 145 to determine operations that are parts of user or non-user sessions. The scope evaluator 140 maintains a list of operations that can trigger an alert as indicated by the suspicious activity 120 and a list of operations that should prevent an alert from being generated. The scope evaluator 140 works in conjunction with the operation relationship detector 150 to identify operations in the list of operations that should prevent an alert from being generated that are related to operations in the list of operations that can trigger an alert. Thus, operations that would normally trigger an alert may be cleared (e.g., allowed to execute without an alert, etc.) if they are related to an operation that is in the list of operations that should prevent an alert from being generated when they have a different scope. For example, an operation resource.keyvault/vaults.accesspolicies/write would trigger an alert, but may be prevented from triggering an alert when it is determined by the scope evaluator that it was generated by an operation resource.resources/tags/write that does not trigger an alert. This prevents operations that would normally trigger an alert from triggering an alert when they are executed at the direction of a trusted operation.

The session evaluator 145 identifies a session in resource manager data by evaluating field data. The session evaluator 145 can evaluate fields such as, but not limited to, EventName, Correlation ID, Operation ID, Timestamp, etc. The EventName field may be evaluated to identify whether an operation is a standalone operation or a follow up operation of another operation. For example, a first or standalone operation can have a BeginRequest EventName value while a follow on operation can have an EndRequest EventName value. The operation cluster generator 155 works in conjunction with the session evaluator to group parent and child operations based on the EventName field into a cluster. The cluster represents a session in which if the parent is an operation that would not trigger an alert, the child operations can be prevented from triggering an alert even if they would otherwise trigger an alert. In an example, the parent operation may be identified based on a value of an authorization action field. For example, the authorization.action field of the child operations may include an identifier of the parent operation.

The Correlation ID field is used by the session evaluator 145 and the operation cluster generator 155 to group bulk operations performed as a result of a triggered action. For example, an operation to create a new virtual machine (VM) can spawn more than fifty additional operations to create resources and configure the environment (e.g., creating the VM, creating virtual network, adjusting disk size, etc.) for the new VM. Each of the operations spawning from the parent operation share a common Correlation ID allowing the session evaluator 145 and the operation cluster generator 155 to identify and group the operations into a cluster. Operations in the cluster can be prevented from triggering an alert if the parent operation would not trigger an alert. Similarly, the Operation ID field can used by the session manager 145 and the operation cluster generator 155 to group operation into clusters because related operations can share a specific Operation ID value.

The operation relationship detector 150 may work in conjunction with the scope evaluator 140 and the session evaluator 145 to identify related operations (e.g., parent-child operations, follow up operations for an originating operation, etc.). The operation relationship manager can include a list of fields and relationship rules for the fields that provide logic for identification of related operations. For example, a rule for the Correlation ID field can provide logic to identify related operations when they have the same Correlation ID value.

The suspicious activity evaluator 160 can evaluate the suspicious activity 120 to identify operations that will trigger an alert. As described above, operations may be evaluated to determine scope and session information to determine if the operations are related to or clustered with parent operations that would not trigger an alert and marks them to be cleared from triggering an alert. The instruction generator 165 receives the marked operations from the suspicious activity evaluator 160 and generates instructions for the security detection system 115 that prevent the security detection system 115 from triggering an alert for the identified operations. In an example, the instructions may modify (e.g., update, delete a record, etc.) the suspicious activity to prevent an operation from triggering an alert. The instructions prevent the security detection system 115 from triggering a false positive alert for operations that are related to trusted operations by scope, session, etc.

Figure 2:
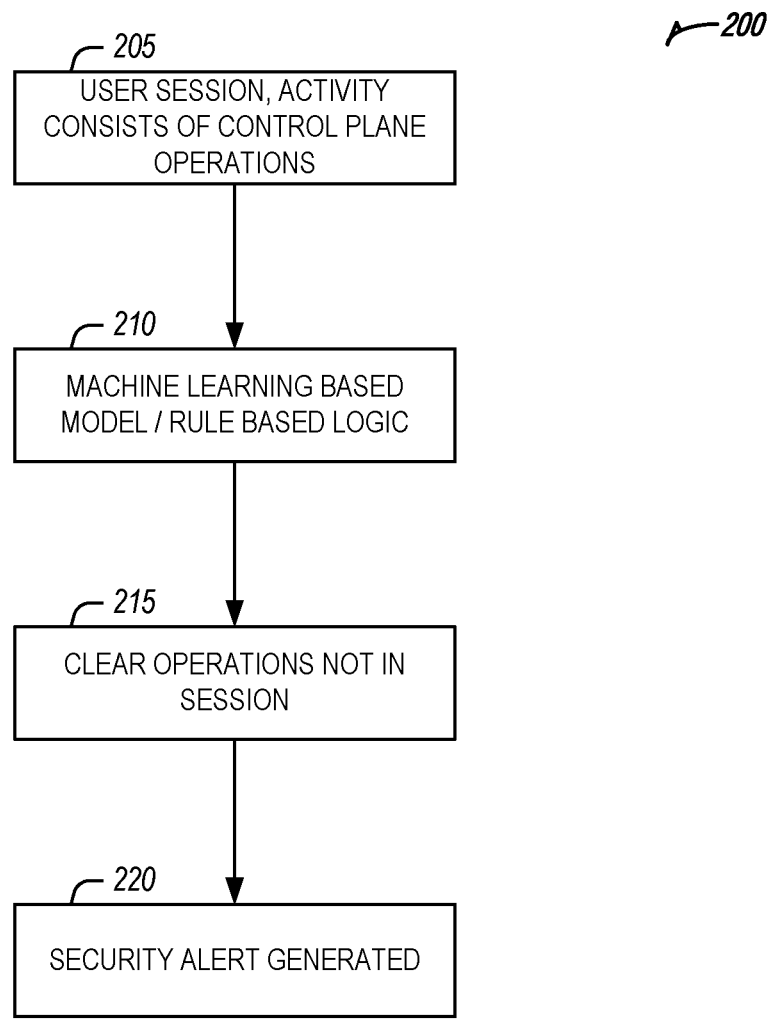
FIG. 2 illustrates a flow diagram of an example of a process for reduction of security detection false positives, according to an embodiment.

FIG. 2 illustrates a flow diagram of an example of a process 200 for reduction of security detection false positives, according to an embodiment. The process 200 can provide features as described in FIG. 1.

A user session is initiated with activity that consists of control plane operations (e.g., at operation 205). For example, a user may initiate creation of a new virtual machine (VM), etc. The operations associated with the activity are evaluated using machine learning models and rule-based logic to identify suspicious activity (e.g., at operation 210). The machine learning models and rule-based logic may be adjusted to balance the level of false positive and false negatives. Models and rules that provide better threat detection may result in a higher level of false positives while reducing the level of false negatives (e.g., actual threats missed in detection, etc.).

Operations that are not in session, but are determined to be safe are cleared from the suspicious activity detected by the detection models and rules (e.g., at operation 215). The operations can be cleared from the suspicious activity if the operation was launched by an operation that was not indicated in the suspicious activity or if the operation is related to an operation that is not indicated in the suspicious activity. For example, a child operation in the suspicious activity that was launched by a parent operation not listed in the suspicious activity, operations that share a Correlation ID or an Operation ID with the parent operation, and operation that are follow on operation of the parent operation can be cleared from the suspicious activity because they represent a low risk because they were spawned by a parent operation that was not detected as suspicious activity. Security alerts are generated for the remaining suspicious activity (e.g., at operation 220).

Figure 3:
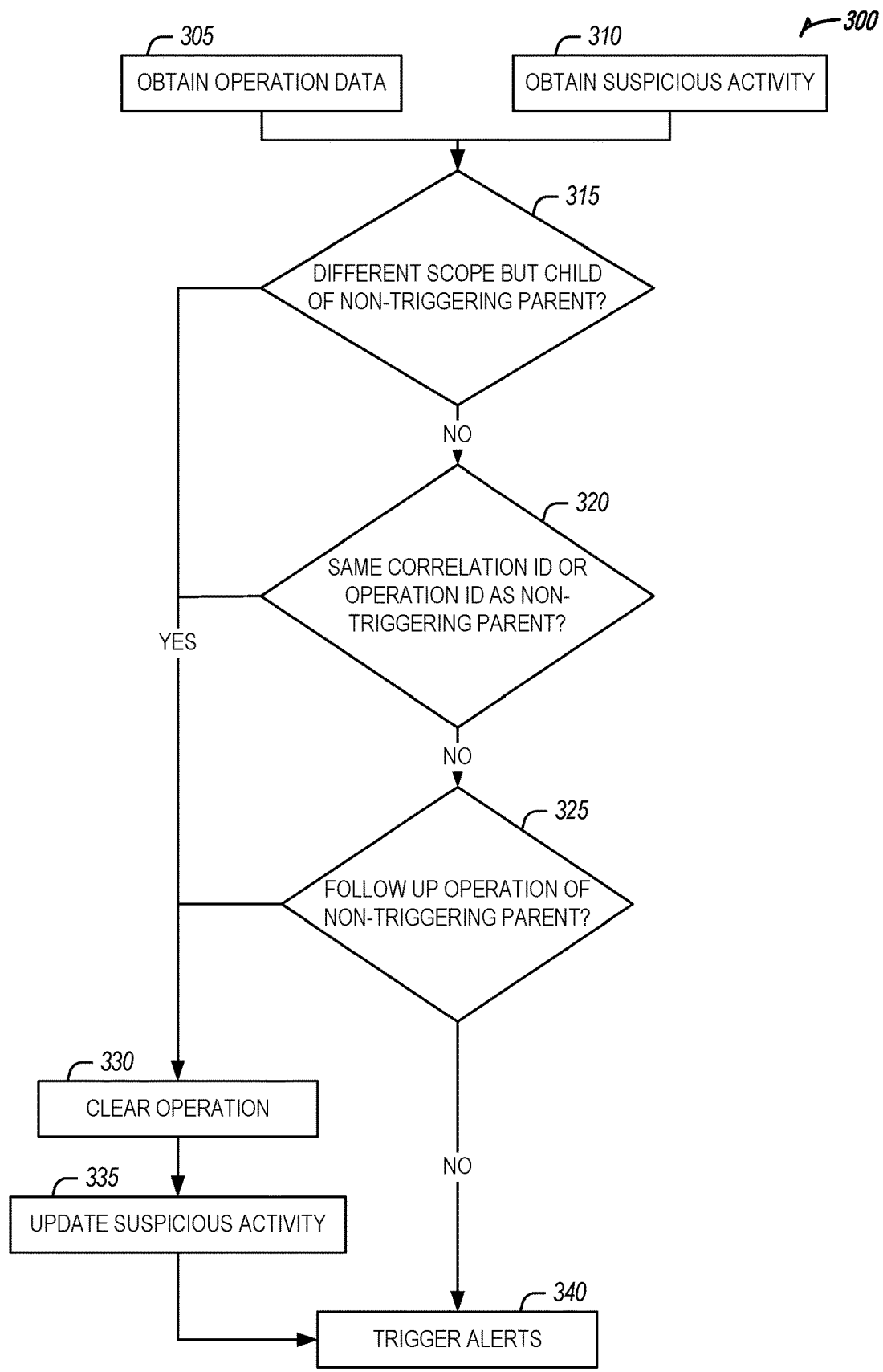
FIG. 3 illustrates a flow diagram of an example of a process for clearing operations for reduction of security detection false positives, according to an embodiment.

FIG. 3 illustrates a flow diagram of an example of a process 300 for clearing operations for reduction of security detection false positives, according to an embodiment. The process 300 can provide features as described in FIGS. 1 and 2.

Operation data is obtained (e.g., at operation 305) and suspicious activity data is obtained (e.g., at operation 310). It is determined (e.g., by the operation data evaluation engine 135 and the suspicious activity evaluator 160 as described in FIG. 1, etc.) if the operation has a different scope but is a child operation of a non-triggering parent operation (e.g., at decision 315). For example, it can be determined that a child operation is in the suspicious activity data, but is a child process instantiated by a parent operation that is not in the suspicious activity data even if the operations have different scopes. If the operation is a child operation of the non-triggering parent operation (e.g., as determined at decision 315), the operation is cleared (e.g., at operation 330).

If the operation cannot be determined to be a child operation of a non-triggering parent operation (e.g., at decision 320), it is determined (e.g., by the operation data evaluation engine 135 and the suspicious activity evaluator 160 as described in FIG. 1, etc.) if the operation has the same correlation ID or operation ID as a non-triggering parent operation (e.g., at decision 320). If the operation has the same correlation ID or operation ID of the non-triggering parent operation (e.g., as determined at decision 320), the operation is cleared (e.g., at operation 330).

If the operation cannot be determined (e.g., at decision 320) to have the same correlation ID or the same operation ID of a non-triggering parent operation, it is determined (e.g., by the operation data evaluation engine 135 and the suspicious activity evaluator 160 as described in FIG. 1, etc.) if the operation is a follow up operation of a non-triggering parent operation (e.g., at decision 325). For example, the operation may not have a BeginReuest EventName value and an authorization.action field that identifies a parent operation and the operation can be identified as follow up operation of the parent operation. If the parent operation is not in the suspicious activity data, the operation may be identified as a follow up operation of a non-triggering parent operation. If the operation is identified as a follow up operation of a non-triggering parent operation. (e.g., as determined at decision 325), the operation is cleared (e.g., at operation 330). While the process 300 shows decisions 315, 320, and 325 as serial decisions, the decisions may be made in parallel or in varying order.

If the operation has been cleared (e.g., at operation 330), the suspicious activity data is updated (e.g., at operation 335) and alerts are triggered using the updated suspicious activity (e.g., at operation 340). If the operation could not be cleared (e.g., at operation 330) because the operation could not be linked to a non-triggering parent operation, an alert will be triggered as indicated by the original suspicious activity data (e.g., at operation 340).

Figure 4:
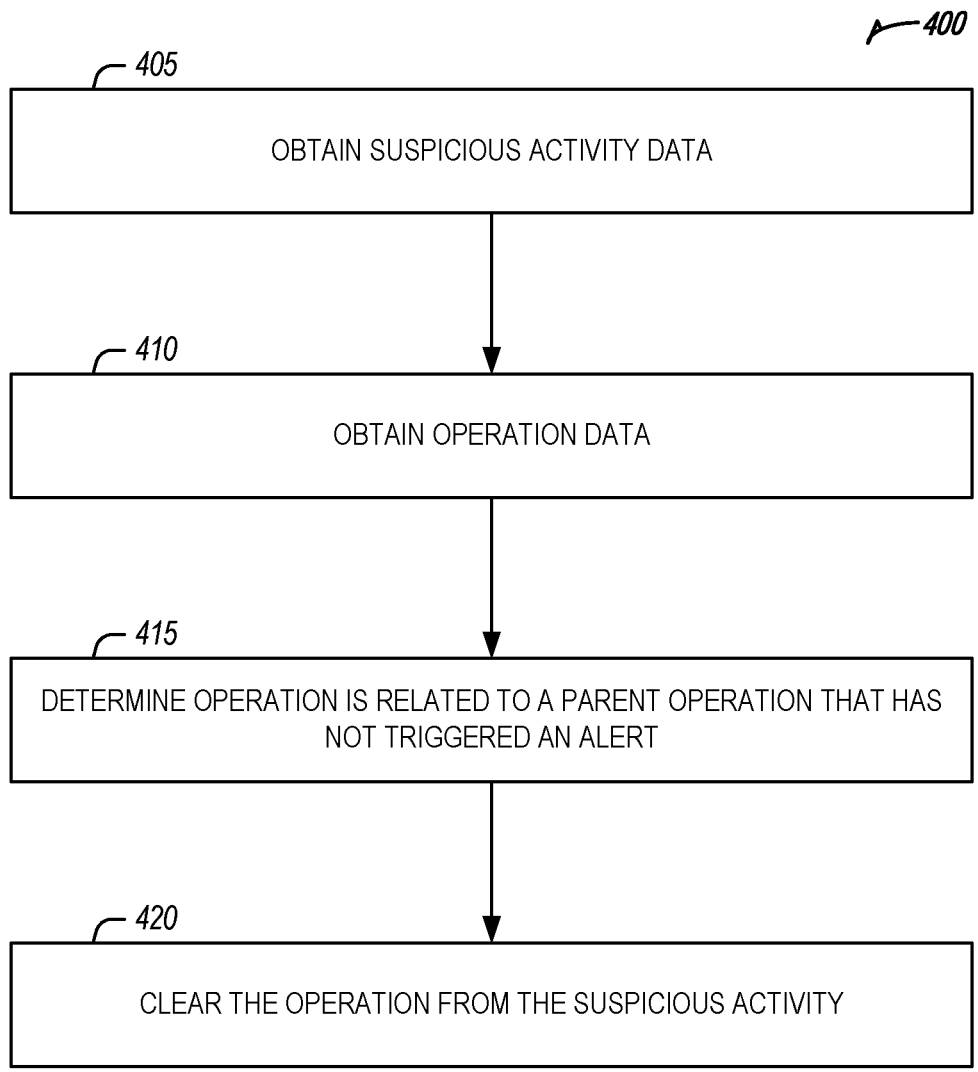
FIG. 4 illustrates an example of a method for reduction of security detection false positives, according to an embodiment.

FIG. 4 illustrates an example of a method 400 for reduction of security detection false positives, according to an embodiment. The method 400 can provide features as described in FIGS. 1 to 3.

Suspicious activity data is obtained for an operation (e.g., at operation 405). In an example, the suspicious activity data can be obtained from output of a security detection machine learning model or a security detection ruleset.

Operation data is obtained for the operation (e.g., at operation 410). In an example, the operation data can be obtained from a computing platform resource manager session.

It is determined that the operation is related to a parent operation that has not triggered an alert (e.g., at operation 415). In an example, the operation can be identified to have a different scope than the parent operation and/or it can be determined that the operation is a resource operation generated by the parent operation. In an example, a correlation identifier can be identified for the operation and that the correlation identifier is equal to a parent correlation identifier of the parent operation. An operation cluster can be generated that includes the operation and the parent operation. In an example, an operation identifier can be identified for the operation and that the operation identifier is equal to a parent operation identifier of the parent operation. An operation cluster can be generated that includes the operation and the parent operation. In an example, parent operation data of the parent operation can be evaluated to determine a parent operation field value that identifies the parent operation as a first operation in a series of operations and the operation data for the operation can be evaluated to determine an operation field value that identifies the operation as an operation subsequent to the parent operation in the series of operations.

The operation is cleared from the suspicious activity data (e.g., at operation 420). In an example, clearing the operation from the suspicious activity data prevents generation of a security alert for the operation.

Figure 5:
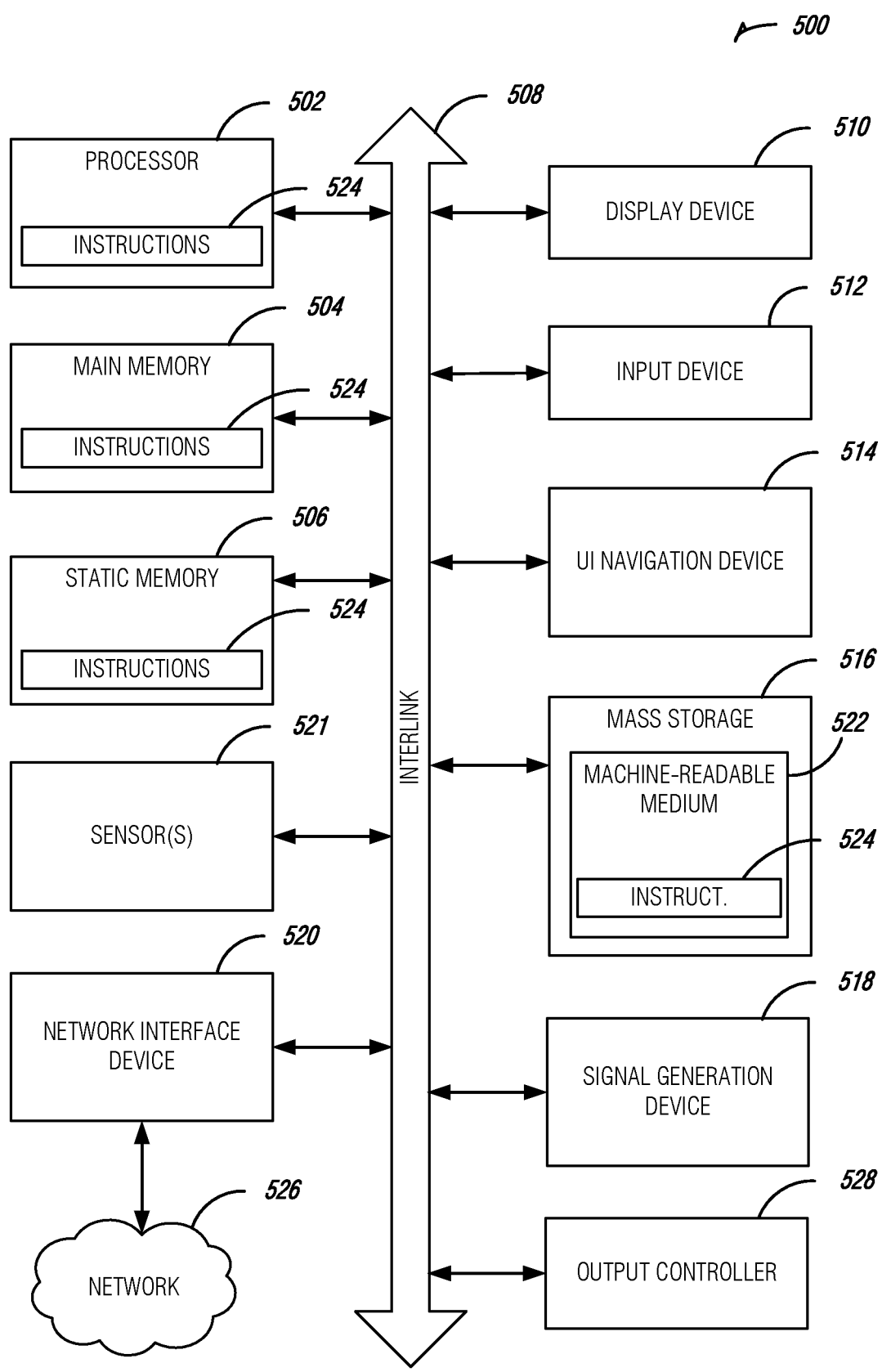
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, 3rd Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes & Examples

Example 1 is a system comprising: at least one processor; and memory comprising instructions that, when executed by the at least one processor, cause the at least one processor to perform operations to: obtain suspicious activity data for an operation; obtain operation data for the operation; identify that the operation has a different scope than a parent operation; determine that the operation is a resource operation generated by the parent operation determine that the parent operation has not triggered an alert; and clear the operation from the suspicious activity data.

In Example 2, the subject matter of Example 1 includes, the memory further comprising instructions that, when executed by the at least one processor, cause the at least one processor to perform operations to: identify a correlation identifier for the operation; determine that the correlation identifier is equal to a parent correlation identifier of the parent operation; generate an operation cluster comprising the operation and the parent operation; and clear members of the operation cluster from the suspicious activity data.

In Example 3, the subject matter of Examples 1-2 includes, the memory further comprising instructions that, when executed by the at least one processor, cause the at least one processor to perform operations to: identify an operation identifier for the operation; determine that the operation identifier is equal to a parent operation identifier of the parent operation; generate an operation cluster comprising the operation and the parent operation; and clear members of the operation cluster from the suspicious activity data.

In Example 4, the subject matter of Examples 1-3 includes, the memory further comprising instructions that, when executed by the at least one processor, cause the at least one processor to perform operations to: evaluate parent operation data of the parent operation to determine a parent operation field value that identifies the parent operation as a first operation in a series of operations; evaluate the operation data for the operation to determine an operation field value that identifies the operation as an operation subsequent to the parent operation in the series of operations; and clear the series of operation from the suspicious activity data.

In Example 5, the subject matter of Examples 1-4 wherein the suspicious activity data is obtained from output of a security detection machine learning model or a security detection ruleset.

In Example 6, the subject matter of Examples 1-5 wherein the operation data is obtained from a computing platform resource manager session.

In Example 7, the subject matter of Examples 1-6 wherein the instructions to clear the operation from the suspicious activity data prevents generation of a security alert for the operation.

Example 8 is at least one non-transitory machine-readable medium comprising instructions that, when executed by at least one processor, cause the at least one processor to perform operations to: obtain suspicious activity data for an operation; obtain operation data for the operation; identify a correlation identifier for the operation; determine that the correlation identifier is equal to a parent correlation identifier of a parent operation; generate an operation cluster comprising the operation and the parent operation using the correlation identifier; determine that the parent operation has not triggered an alert; and clear members of the operation cluster from the suspicious activity data.

In Example 9, the subject matter of Example 8 includes, instructions that, when executed by the at least one processor, cause the at least one processor to perform operations to: identify that the operation has a different scope than the parent operation; determine that the operation is a resource operation generated by the parent operation; and clear the operation from the suspicious activity data.

In Example 10, the subject matter of Examples 8-9 includes, instructions that, when executed by the at least one processor, cause the at least one processor to perform operations to: identify an operation identifier for the operation; determine that the operation identifier is equal to a parent operation identifier of the parent operation; and generate the operation cluster using the operation identifier.

In Example 11, the subject matter of Examples 8-10 includes, instructions that, when executed by the at least one processor, cause the at least one processor to perform operations to: evaluate parent operation data of the parent operation to determine a parent operation field value that identifies the parent operation as a first operation in a series of operations; evaluate the operation data for the operation to determine an operation field value that identifies the operation as an operation subsequent to the parent operation in the series of operations; and clear the series of operations from the suspicious activity data.

In Example 12, the subject matter of Examples 8-11 wherein the suspicious activity data is obtained from output of a security detection machine learning model or a security detection ruleset.

In Example 13, the subject matter of Examples 8-12 wherein the operation data is obtained from a computing platform resource manager session.

In Example 14, the subject matter of Examples 8-13 wherein the instructions to clear the operation from the suspicious activity data prevents generation of a security alert for the operation.

Example 15 is a method comprising: obtaining suspicious activity data for an operation; obtaining operation data for the operation; determining that the operation is related to a parent operation that has not triggered an alert; and clearing the operation from the suspicious activity data.

In Example 16, the subject matter of Example 15 wherein determining that the operation is related to a parent operation that has not triggered an alert further comprises: identifying that the operation has a different scope than the parent operation; and determining that the operation is a resource operation generated by the parent operation.

In Example 17, the subject matter of Examples 15-16 wherein determining that the operation is related to a parent operation that has not triggered an alert further comprises: identifying a correlation identifier for the operation; determining that the correlation identifier is equal to a parent correlation identifier of the parent operation; and generating an operation cluster comprising the operation and the parent operation.

In Example 18, the subject matter of Examples 15-17 wherein determining that the operation is related to a parent operation that has not triggered an alert further comprises: identifying an operation identifier for the operation; determining that the operation identifier is equal to a parent operation identifier of the parent operation; and generating an operation cluster comprising the operation and the parent operation.

In Example 19, the subject matter of Examples 15-18 wherein determining that the operation is related to a parent operation that has not triggered an alert further comprises: evaluating parent operation data of the parent operation to determine a parent operation field value that identifies the parent operation as a first operation in a series of operations; and evaluating the operation data for the operation to determine an operation field value that identifies the operation as an operation subsequent to the parent operation in the series of operations.

In Example 20, the subject matter of Examples 15-19 wherein the suspicious activity data is obtained from output of a security detection machine learning model or a security detection ruleset.

In Example 21, the subject matter of Examples 15-20 wherein the operation data is obtained from a computing platform resource manager session.

In Example 22, the subject matter of Examples 15-21 wherein clearing the operation from the suspicious activity data prevents generation of a security alert for the operation.

Example 23 is at least one machine-readable medium comprising instructions that, when executed by a machine, cause the machine to perform any method of Examples 15-22.

Example 24 is a system comprising means to perform any method of Examples 15-22.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system comprising:
    at least one processor; and
    memory comprising instructions that, when executed by the at least one processor, cause the at least one processor to perform operations to:
        obtain suspicious activity data for an operation;
        obtain operation data for the operation;
        identify that the operation has a different scope than a parent operation;
        determine that the operation is a resource operation generated by the parent operation
        determine that the parent operation has not triggered an alert; and
        clear the operation from the suspicious activity data.

2. The system of claim 1, the memory further comprising instructions that, when executed by the at least one processor, cause the at least one processor to perform operations to:
    identify a correlation identifier for the operation;
    determine that the correlation identifier is equal to a parent correlation identifier of the parent operation;
    generate an operation cluster comprising the operation and the parent operation; and
    clear members of the operation cluster from the suspicious activity data.

3. The system of claim 1, the memory further comprising instructions that, when executed by the at least one processor, cause the at least one processor to perform operations to:
    identify an operation identifier for the operation;
    determine that the operation identifier is equal to a parent operation identifier of the parent operation;
    generate an operation cluster comprising the operation and the parent operation; and
    clear members of the operation cluster from the suspicious activity data.

4. The system of claim 1, the memory further comprising instructions that, when executed by the at least one processor, cause the at least one processor to perform operations to:

evaluate parent operation data of the parent operation to determine a parent operation field value that identifies the parent operation as a first operation in a series of operations;

evaluate the operation data for the operation to determine an operation field value that identifies the operation as an operation subsequent to the parent operation in the series of operations; and clear the series of operation from the suspicious activity data.

5. The system of claim 1, wherein the suspicious activity data is obtained from output of a security detection machine learning model or a security detection ruleset.

6. The system of claim 1, wherein the operation data is obtained from a computing platform resource manager session.

7. The system of claim 1, wherein the instructions to clear the operation from the suspicious activity data prevents generation of a security alert for the operation.

8. At least one non-transitory machine-readable medium comprising instructions that, when executed by at least one processor, cause the at least one processor to perform operations to:

obtain suspicious activity data for an operation;
obtain operation data for the operation;
identify a correlation identifier for the operation;
determine that the correlation identifier is equal to a parent correlation identifier of a parent operation;
generate an operation cluster comprising the operation and the parent operation using the correlation identifier;
determine that the parent operation has not triggered an alert; and
clear members of the operation cluster from the suspicious activity data.

9. The at least one non-transitory machine-readable medium of claim 8, further comprising instructions that, when executed by the at least one processor, cause the at least one processor to perform operations to:

identify that the operation has a different scope than the parent operation;
determine that the operation is a resource operation generated by the parent operation; and
clear the operation from the suspicious activity data.

10. The at least one non-transitory machine-readable medium of claim 8, further comprising instructions that, when executed by the at least one processor, cause the at least one processor to perform operations to:

identify an operation identifier for the operation;
determine that the operation identifier is equal to a parent operation identifier of the parent operation; and
generate the operation cluster using the operation identifier.

11. The at least one non-transitory machine-readable medium of claim 8, further comprising instructions that, when executed by the at least one processor, cause the at least one processor to perform operations to:

evaluate parent operation data of the parent operation to determine a parent operation field value that identifies the parent operation as a first operation in a series of operations;

evaluate the operation data for the operation to determine an operation field value that identifies the operation as an operation subsequent to the parent operation in the series of operations; and clear the series of operations from the suspicious activity data.

12. The at least one non-transitory machine-readable medium of claim 8, wherein the suspicious activity data is obtained from output of a security detection machine learning model or a security detection ruleset.

13. The at least one non-transitory machine-readable medium of claim 8, wherein the operation data is obtained from a computing platform resource manager session.

14. The at least one non-transitory machine-readable medium of claim 8, wherein the instructions to clear the operation from the suspicious activity data prevents generation of a security alert for the operation.

15. A method comprising:
obtaining suspicious activity data for an operation;
obtaining operation data for the operation;
determining that the operation is related to a parent operation that has not triggered an alert; and
clearing the operation from the suspicious activity data.

16. The method of claim 15, wherein determining that the operation is related to a parent operation that has not triggered an alert further comprises:

identifying that the operation has a different scope than the parent operation; and
determining that the operation is a resource operation generated by the parent operation.

17. The method of claim 15, wherein determining that the operation is related to a parent operation that has not triggered an alert further comprises:

identifying a correlation identifier for the operation;
determining that the correlation identifier is equal to a parent correlation identifier of the parent operation; and
generating an operation cluster comprising the operation and the parent operation.

18. The method of claim 15, wherein determining that the operation is related to a parent operation that has not triggered an alert further comprises:

identifying an operation identifier for the operation;
determining that the operation identifier is equal to a parent operation identifier of the parent operation; and
generating an operation cluster comprising the operation and the parent operation.

19. The method of claim 15, wherein determining that the operation is related to a parent operation that has not triggered an alert further comprises:

evaluating parent operation data of the parent operation to determine a parent operation field value that identifies the parent operation as a first operation in a series of operations; and evaluating the operation data for the operation to determine an operation field value that identifies the operation as an operation subsequent to the parent operation in the series of operations.

20. The method of claim 15, wherein the suspicious activity data is obtained from output of a security detection machine learning model or a security detection ruleset.

* * * * *